United States Patent
Hamerski et al.

(10) Patent No.: US 7,055,360 B2
(45) Date of Patent: Jun. 6, 2006

(54) METHOD OF APPLYING A FORCE TO A WORK PIECE

(75) Inventors: Michael D. Hamerski, Baldwin, WI (US); James L. Bries, Cottage Grove, MN (US); James F. Pitzen, Maplewood, MN (US); Ronald C. Johansson, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 68 days.

(21) Appl. No.: 10/749,580

(22) Filed: Dec. 31, 2003

(65) Prior Publication Data

US 2005/0138986 A1    Jun. 30, 2005

(51) Int. Cl.
*B21D 31/00* (2006.01)
(52) U.S. Cl. .................. 72/379.2; 72/454; 72/458; 72/705
(58) Field of Classification Search ............. 72/390.5, 72/390.6, 390.7, 379.2, 454, 457, 458, 465.1, 72/466.6, 478, 479, 705; 428/40.1, 42.2, 428/42.3
See application file for complete search history.

(56) References Cited

U.S. PATENT DOCUMENTS

| | | | |
|---|---|---|---|
| 3,712,106 A * | 1/1973 | Holsapple et al. ............ 72/309 |
| 3,770,259 A | 11/1973 | Wagreich |
| 4,024,312 A | 5/1977 | Korpman |
| 4,440,374 A | 4/1984 | Achille |
| 4,457,503 A | 7/1984 | Connor |
| 4,702,736 A | 10/1987 | Kalt et al. |
| 4,946,539 A | 8/1990 | Ales et al. |
| 4,991,807 A | 2/1991 | Radnich |
| 5,192,060 A | 3/1993 | Novak |
| 5,516,581 A | 5/1996 | Kreckel et al. |
| 5,820,116 A | 10/1998 | Haese |
| 5,921,514 A * | 7/1999 | Schumann ............... 248/205.3 |
| 6,131,864 A | 10/2000 | Schumann |
| 6,136,397 A * | 10/2000 | Luhmann et al. .......... 428/40.1 |
| 6,231,962 B1 | 5/2001 | Bries et al. |
| 6,317,952 B1 | 11/2001 | Vogt |
| 6,722,179 B1 * | 4/2004 | Ventura ........................ 72/454 |
| 6,773,780 B1 * | 8/2004 | Hutter, III ................. 428/40.1 |
| 6,792,790 B1 * | 9/2004 | Ritter ........................... 72/458 |
| 6,874,347 B1 * | 4/2005 | Meichtry ..................... 72/458 |

FOREIGN PATENT DOCUMENTS

| | | |
|---|---|---|
| DE | 33 31 016 C2 | 7/1992 |
| DE | 200 03 647 U1 | 6/2000 |
| DE | 101 49 246 | 6/2002 |
| FR | 2 660 711 | 10/1991 |
| WO | WO 87/01324 | 3/1987 |

* cited by examiner

*Primary Examiner*—Ed Tolan
(74) *Attorney, Agent, or Firm*—David B. Patchett

(57) ABSTRACT

A method of applying a tensile or compressive force to a selected location of a work piece or surface without damaging the work piece or the surface and without leaving adhesive residue thereon includes providing a device including a body member and a force applying member movably connected with the body member, attaching the body member and/or the force applying member to the work piece and/or surface using a double-sided stretch releasing adhesive such that one end of the force applying member is adjacent the selected location, and moving the force applying member toward the work piece or surface to generate a compressive force, or moving the force applying member away from the work piece or surface to generate a tensile force.

21 Claims, 3 Drawing Sheets

METHOD OF APPLYING A FORCE TO A WORK PIECE

FIELD OF THE INVENTION

The present invention relates generally to a method of applying a force, which can be either a compressive force or tensile force, to an object or surface, and more particularly, to such a method that allows a device to be attached to a surface to apply the force, and allows the device to be easily removed from the surface and/or object without damaging the surface and/or object or leaving adhesive residue thereon.

BACKGROUND OF THE INVENTION

Clamping devices for applying a force to an object or surface are known in the prior art. U.S. Pat. No. 5,820,116 (Haese), for example, discloses a suction attachable retaining clamp for holding an object such as a molding or mounting bracket against a surface such as a windshield. U.S. Pat. No. 4,457,503 (Conner) discloses a suction clamp for holding moldings in place on front or rear windshields of automobiles, while an adhesive material sets or dries, and it simultaneously prevents damage to the adjacent surface. Such clamps, however, are limited to producing compressive forces, and work best on clean, slightly moistened, non-porous surfaces such as metal and glass.

There is a need, therefore, for a method that allows either a compressive (i.e. clamping) force or a tensile (i.e. pulling) force to be directed to a surface or object. It would therefore be desirable to provide a method of applying a tensile or compressive force to a surface or object that allows a device to be attached to the surface and/or object to apply the force, and allows the device to be easily removed from the surface and/or object without damaging the surface and/or object and without leaving unwanted residue on the surface and/or object. It would also be desirable to provide a method that allows a force to be applied to surfaces made from a wide variety of surfaces including metal, glass, paper, masonry and unfinished wood, and is not limited to use on non-porous surfaces such as metal and glass.

SUMMARY OF THE INVENTION

The present invention overcomes the above-identified limitations by providing a method of applying a tensile or compressive force to a selected location of a work piece. In one aspect, the method comprises the steps of providing a device including a body member and a force applying member movably connected with the body member, attaching the body member to a surface using double-sided stretch releasable adhesive, whereby one end of the force applying member is adjacent the selected location, and moving the force applying member toward the surface to generate a compressive force.

In another aspect, the present invention provides a method comprising the steps of providing a device including a body member and a force applying member movably connected with the body member, arranging the body member on a surface, whereby one end of the force applying member is adjacent the selected location, attaching the force applying member to the surface using double-sided stretch releasable adhesive, and moving the force applying member away from the surface to generate a tensile force.

In an advantageous aspect of the invention, the surface may be formed of a cellulosic material such as paper, paperboard, or cardboard, or from masonry or cement-like materials such as stone, cinder blocks, and concrete.

In one embodiment of the invention, the body member includes a connecting portion containing a through bore, a pair of legs extending in the same direction from opposite sides of the connecting portion, and a pair of feet portions extending in opposite directions from the ends of the leg portions opposite from the connecting portion. In a more specific aspect, each foot portion is provided with a double-sided strip of stretch releasing adhesive for attaching the body to a surface.

In another embodiment, the body includes a main body portion and a cantilever portion extending laterally outwardly from the main body portion, wherein the force applying member is movably connected with the cantilever portion.

The force applying member may be a plunger threadably connected with the body, whereby the plunger can be rotated clockwise and counter clockwise to produce the compressive and tensile forces. In an alternate embodiment, the plunger is slidably connected with the body, and the plunger is biased by a spring or the like to produce the forces. In yet another embodiment, the force applying member is pivotally connected with the body member in the form of a lever and the lever is pivoted to produce the compressive and tensile forces.

The compressive and tensile forces generated by the method of the present invention can be used for a wide variety of uses and applications such as holding an object in place while an adhesive, such as a hot melt adhesive, glue, or epoxy sets, dries, or otherwise cures. This may be useful, for example, to mount a soap dish to a ceramic tile wall using an epoxy. The force may also find use in woodworking, crafts, or other uses in the home, office, or in industrial applications. For example, the present invention may be used to stamp or emboss a piece of paper or piece of wood.

In a more specific aspect, the invention provides a method of removing a dent from a surface, comprising the steps of providing a device including a body member and a force applying member movably connected with the body member, arranging the device on the surface such that one end of the force applying member is adjacent the dent, attaching the force applying member to the dented surface using stretch releasable adhesive, and moving the force applying member away from the surface to generate a pulling force, whereby the pulling force is sufficient to remove the dent. In this aspect, the invention may be used to generate a tensile force for removing a dent from a variety of surfaces such as, for example, automotive vehicles including automobiles, boats, and RV's, or from aluminum siding, without damaging the surface and without leaving any adhesive residue on the surface.

Thus, the invention may be used interchangeably to produce either a compressive (i.e. clamping) force or a tensile (i.e. pulling) force where in the past, separate devices were needed to create compressive and tensile forces. In a preferred embodiment, the method uses a simple and inexpensive single-sided clamp-like device that can be arranged on a surface and used not only as a clamp, but can also be used to produce a pulling or tensile force at a selected location on a surface or an object.

BRIEF DESCRIPTION OF THE DRAWINGS

The present invention will be further described with reference to the accompanying drawings, in which.

DETAILED DESCRIPTION

Figure 1:
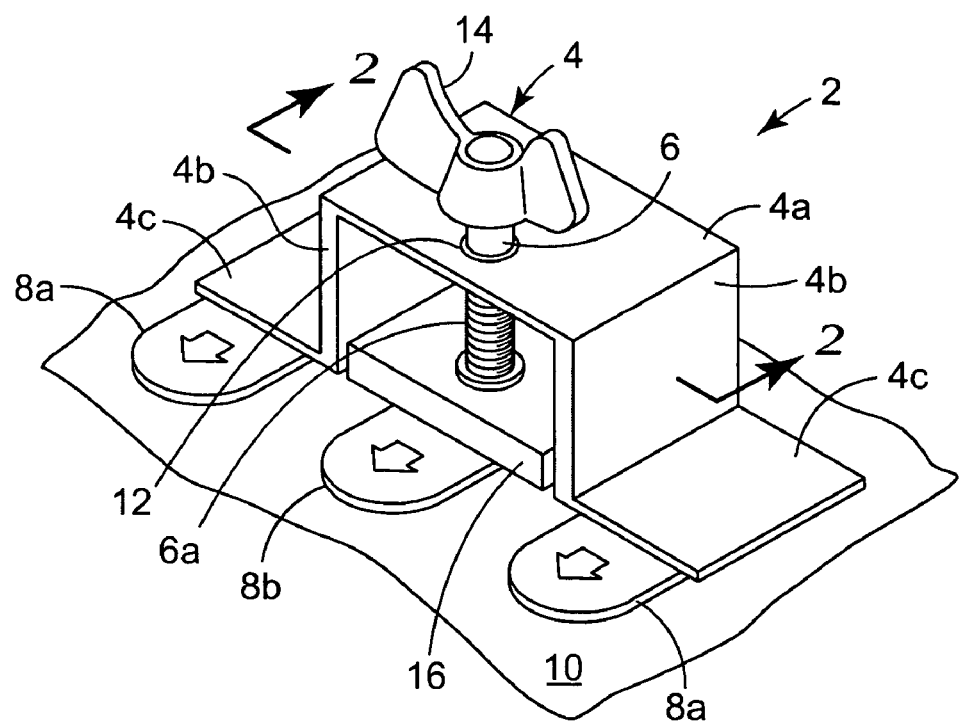
FIG. 1 is a perspective view of a device that can be used in accordance with the method of the invention.
Figure 2:
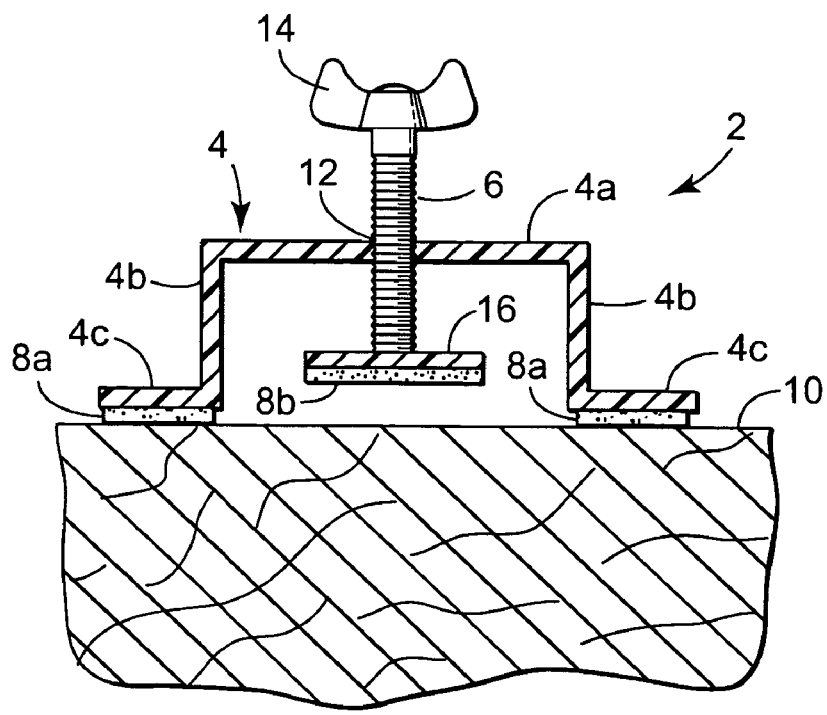
FIG. 2 is a sectional view taken along line 2—2 of FIG. 1.

Referring now to the drawings, FIGS. 1 and 2 show a device 2 that can be used in accordance with the method of the present invention. The device 2 includes a body member 4, a force applying member in the form of a plunger 6 rotatably attached to the body member 4, a pair of double-sided stretch releasing adhesive strips 8a attached to the body member 4 to removably adhesively bond the body member 4 to a surface 10, and a double-sided stretch releasing adhesive strip 8b attached to the plunger 6 for adhesively bonding the plunger 6 to either the surface 10, or an object (not shown) arranged between the plunger 6 and the surface 10. Throughout the description and the accompanying figures, functionally similar features are referred to with like reference numerals incremented by 100.

Stretch releasing adhesive tapes represent a class of high performance pressure-sensitive adhesives combining strong holding power with clean removal and no surface damage. Such stretch releasing adhesive tapes are useful in a wide variety of assembling, joining, attaching, and mounting applications. The double-sided adhesive strips 8a,b may be any conventionally known stretch releasing adhesive tape including a stretch releasing adhesive tape with an elastic backing, a stretch releasing adhesive tape with a highly extensible and substantially inelastic backing, or a stretch releasing adhesive tape comprising a solid elastic pressure sensitive adhesive.

Specific tapes suitable for use in the various embodiments of the present invention include the pressure sensitive adhesives with elastic backings described in U.S. Pat. No. 4,024,312 (Korpman), the pressure sensitive adhesives with highly extensible and substantially inelastic backings described in U.S. Pat. No. 5,516,581 (Kreckel et al.) and Bries et al. (U.S. Pat. No. 6,231,962), and the solid elastic pressure sensitive adhesive described in German Patent No. 33 31 016.

A suitable double-sided commercially available stretch releasing adhesive is the product sold under the trade designation COMMAND adhesive by 3 M Company, St. Paul, Minn. This product is currently manufactured in discrete strips with one end of the strip including a non-adhesive pull tab to facilitate stretching of the strip during removal.

In the embodiment depicted in FIGS. 1 and 2, the body member 4 includes a bridge portion 4a containing an internally threaded opening 12 for rotatably receiving the plunger 6, a pair of parallel leg portions 4b extending perpendicularly in the same direction from opposite sides of the bridge portion 4a, and a pair of feet portions 4c extending outwardly in opposite directions from the ends of the leg portions 4b. The adhesive strips 8a are affixed to the bottom surfaces of the feet portions 4c to adhesively bond the body member 4 to surface 10, and thereby securely bond the device 2 to the surface 10.

Plunger 6 is arranged generally perpendicular to the bridge portion 4a and includes a cylindrical threaded body portion 6a which mates with and rotatably engages the threaded opening 12 in the body member 4, a handle 14 arranged at one end of the body portion 6a to facilitate manual rotation of the plunger 6, and a head 16 arranged at the end of the body portion 6a opposite the handle 14. The handle 14 is arranged above the bridge portion 4a of the body member 4 to allow a user to readily access the handle 14 and thereby manually rotate the plunger 6. The head 16 is arranged below the bridge portion 4a and is axially movable by rotational actuation of the plunger 6 via handle 14 either in the direction of the surface 10, thereby to apply a force to the surface, or away from the surface 10, thereby to generate a tensile force relative to the surface. Head 16 is preferably connected with the plunger 6 with a slip fit type of connection to allow the body portion 6a and the head 16 to move independently. That is, the body portion 6a of the plunger 6 is permitted to rotate while the head 16 does not rotate.

In accordance with one aspect of the method of the present invention, the device 2 is used to apply a force to surface 10 or an object (not shown) arranged between the plunger 6 and the surface 10, by rotating the plunger 6 such that the head 16 moves in the direction of the surface 10. As the plunger 6 moves toward and engages the surface 10, a compressive force will be exerted on the surface 10 or on the object. It will be recognized that when the device is used in this manner (i.e. as a clamp to generate a compressive force), adhesive strips 8a are needed to maintain the device 2 in engagement with surface 10, but that adhesive strip 8b is not needed because the plunger 6 is maintained in contact with surface 10 via compression. Stated another way, when the device 2 is used as a clamp, the plunger 6 is forced against the surface 10 which, in turn, forces the body member 4 away from the surface 10, and the adhesive strips 8a serve to hold the body member 4 in contact with the surface 10 to allow the plunger 6 to exert a compressive force on the surface. To remove the device 2 from the surface 10, each adhesive strip 8a is stretched in the known manner to debond the adhesive strip from the device and surface simultaneously.

Conversely, to use the device 2 to generate a pulling or stretching force on surface 10 or on an object (not shown) arranged between the surface 10 and the head 16, stretch releasing adhesive strip 8b is provided to attach the head 16 to the surface 10 or object, thereby to adhesively bond the plunger 6 to the surface 10 or object. When the plunger 6 is rotated such that the head 16 moves away from the surface 10, a tensile force will be exerted on the surface 10 or object. When used in this manner (i.e. as a pulling device to generate a tensile force relative to the surface), adhesive strip 8b is needed to attach the plunger 6 to the surface 10 or object, but it will be recognized that adhesive strips 8a are not needed to secure the device 2 to the surface because the device is maintained in contact with the surface 10 via compression.

Figure 3:
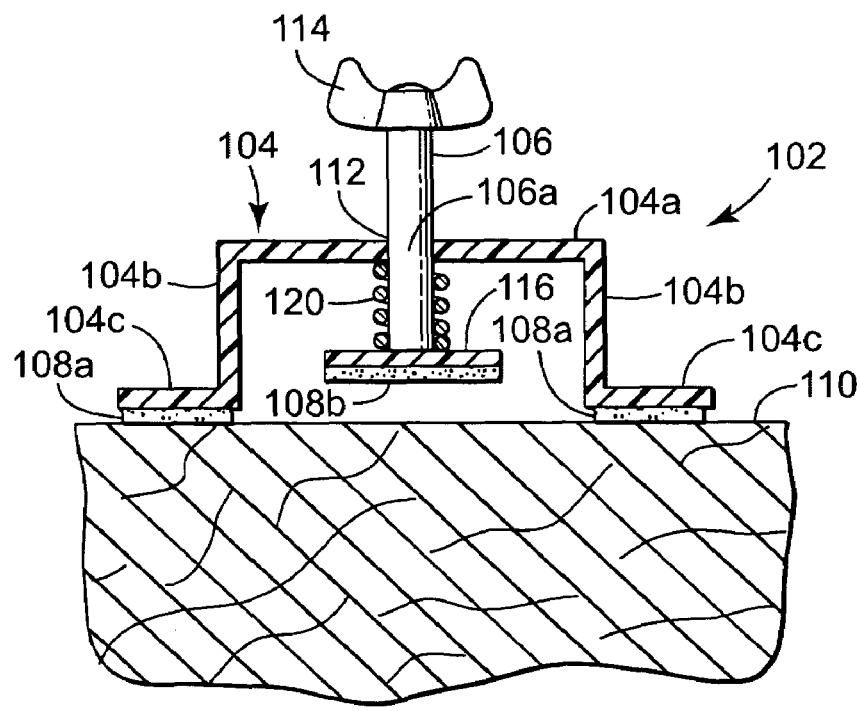
FIG. 3 is a side sectional view of a second embodiment of a device that can be used in accordance with the invention.

FIG. 3 shows another device 102 that can be used to apply a tensile or compressive force to an object or surface. The device 102 is similar to the device 2 shown in FIGS. 1 and 2 except the device 102 includes a spring 120 which urges the plunger 106 toward the surface 110, thereby to produce a compression force on the surface 110.

The device 102 includes a body member 104, a force applying member in the form of a plunger 106 movably connected with the body member 104, a pair of double-sided stretch releasing adhesive strips 108a attached to the body member 104 to removably adhesively bond the body member 104 to the surface 110, and a double-sided stretch releasing adhesive strip 108b attached to the plunger 106 for adhesively bonding the plunger 106 to surface 110 or an object (not shown) arranged between the plunger 106 and the surface 110.

The body member 104 includes a bridge portion 104a containing an opening 112 for slidably receiving the plunger 106, a pair of parallel leg portions 104b extending perpendicularly in the same direction from opposite sides of the bridge portion 104a, and a pair of feet portions 104c extending outwardly in opposite directions from the ends of the leg portions 104b. The adhesive strips 108a are affixed to the bottom surfaces of the feet portions 104c to adhesively bond the body member 104 to surface 110, and thereby securely bond the device 102 to the surface 110.

Plunger 106 is arranged generally perpendicular to the bridge portion 104a and includes a cylindrical body portion 106a slidably engaging the opening 112 in the body member 104, a handle 114 arranged at one end of the body portion 106a to facilitate manual actuation of the plunger 106, and a head 116 arranged at the end of the body portion 106a opposite the handle 114. The handle 114 is arranged above the bridge portion 104a of the body member 104 to allow a user to readily access the handle 114, and thereby manually actuate the plunger 106 away from the surface 110.

Spring 120 is arranged between the bridge portion 104a of the device 102 and the head 116. To use the device 102 to produce a compressive force, spring 120 is provided as a compression spring that is under compression when the head 116 engages the surface 110, thereby forcing the head 116 against the surface 110. In this manner, spring 120 serves to urge the head 116 toward the surface 110 whenever the head 116 is arranged either against or above the surface 110. It will be recognized that when the device is used in this manner (i.e. as a clamp to generate a compressive force), adhesive strips 108a are needed to maintain the device 102 in engagement with surface 110, but that adhesive strip 108b is not needed because the plunger 106 is maintained in contact with surface 110 via compression. Stated another way, when the device 102 is used as a clamp, the plunger 106 is forced against the surface 110 via spring 120 which, in turn, forces the body member 104 away from the surface 110, and the adhesive strips 108a serve to hold the body member 104 in contact with the surface 110 to allow the plunger 106 to exert a compressive force on the surface. To remove the device 102 from the surface 110, each adhesive strip 108a is stretched in the known manner to debond the adhesive strip from the device and surface simultaneously.

Alternatively, the spring 120 can be a tension spring that is attached to the bridge portion 104a and the head 116, such that when the spring is urged downwardly in the direction of the surface 110, the spring is put in tension. In this manner, when the head 116 is attached to the surface 110 via adhesive strip 108b, a tensile force is produced on the surface 110. When used in this manner (i.e. as a pulling device to generate a tensile force relative to the surface), adhesive strip 108b is needed to attach the plunger 106 to the surface 110 or the object, but it will be recognized that adhesive strips 108a are not needed to secure the device 102 to the surface because the device is maintained in contact with the surface 110 via compression.

As with the device 2 of FIGS. 1 and 2, head 116 is preferably connected with the plunger 106 with a slip fit type of connection to allow the body portion 106a and the head 116 to move independently.

Figure 4:
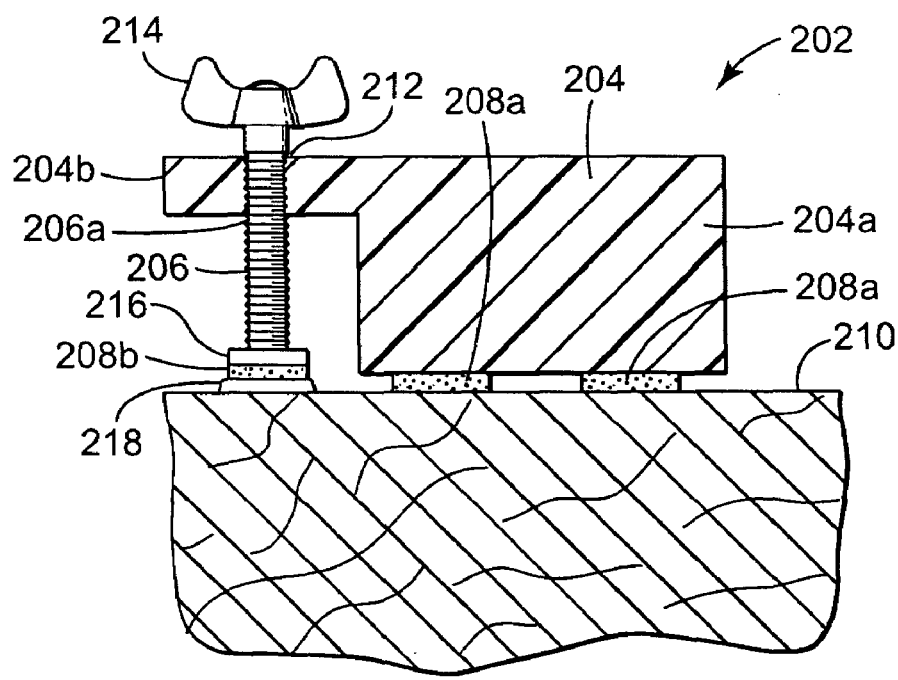
FIG. 4 is a side sectional view of a third embodiment of a device that can be used in accordance with the invention.

FIG. 4 shows another device 202 that can be used to apply a tensile or compressive force to an object or surface. The device 202 includes a body member 204, a force applying member in the form of a plunger 206 rotatably attached to the body member 204, a pair of double-sided stretch releasing adhesive strips 208a attached to the body member 204 to removably adhesively bond the body member 204 to a surface 210, and a double-sided stretch releasing adhesive strip 208b attached to the plunger 206 for adhesively bonding the plunger 206 to surface 210 or an object 218 arranged between the plunger 206 and the surface 210. The device of FIG. 4 is particularly suited for applying a tensile or compressive force in a tight location such as a corner, where the device shown in FIGS. 1 and 2 would not fit.

The body member 204 includes a main body portion 204a and a cantilever portion 204b containing a threaded opening 212 for receiving the plunger 206. The cantilever portion 204b extends laterally outwardly from the upper edge of the main body portion 204a. Adhesive strips 208a are affixed to the bottom of the main body portion 204a to adhesively bond the body member 204 to the surface 210, and thereby secure the device 202 to the surface 210.

Plunger 206 is arranged generally perpendicular to the cantilever portion 204b and includes a cylindrical threaded body portion 206a rotatably engaging the opening 212 in the body member 204, a handle 214 arranged at one end of the body portion 206a to facilitate manual rotation of the plunger 206, and a head 216 arranged at the opposite end of the body portion 206a. The handle 214 is arranged above the cantilever portion 204b of the body member 204 to allow a user to readily access the handle 214, and thereby manually adjust the plunger 206. The head 216 is arranged below the cantilever portion 204b and may be rotatably urged via handle 214 either in the direction of the surface 210 to apply a compressive force to the surface, or urged away from the surface 210 to generate a tensile force relative to the surface.

Device 202 is used to apply a compressive force to object 218 in the same manner as the device of FIGS. 1 and 2, that is, the plunger 206 is rotated such that the head 216 moves in the direction of the surface 210. As the plunger 206 moves toward and engages the object 218, a compressive force will be exerted on object 218. And to use the device 202 to impart a pulling or stretching force on object 218 which is secured to the surface 210, stretch releasing adhesive strip 208b is used to attach the head 216 to the object 218, thereby adhesively bonding the plunger 206 to the object 218. Secured in this manner, when the plunger 206 is rotated such that the head 216 moves away from the surface 210, a tensile force will be exerted on the object 218.

Because of its cantilevered design, the device 202 of FIG. 4 is less stable than the device 2 of FIGS. 1 and 2. Consequently, when the device 202 of FIG. 4 is used as either a clamping device to generate a compressive force or as a pulling device to generate a tensile force, it is desirable to include stretch releasing adhesive strips 208a to firmly bond and thereby secure the body member 204 to the support surface 210. As with the device 2 of FIGS. 1 and 2, when the device 202 is used to generate a tensile force, adhesive strip 208b is required, but when the device is used as a clamp, adhesive strip 208b may be omitted.

Figure 5:
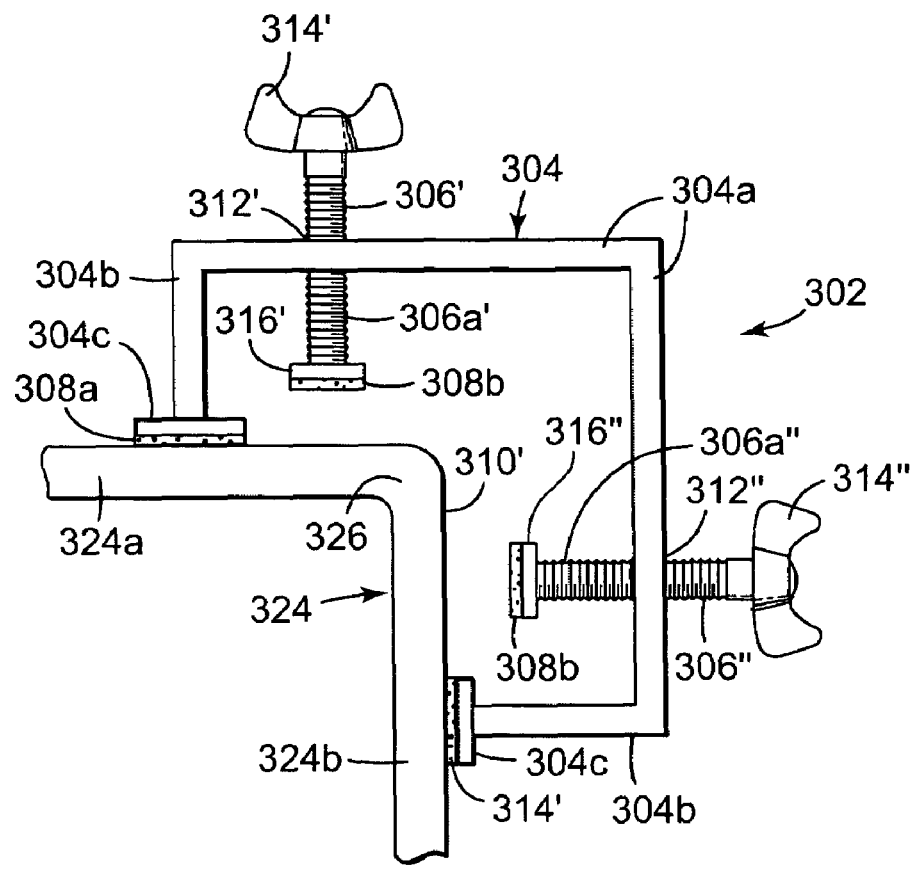
FIG. 5 is a side view of a fourth embodiment of a device that can be used in accordance with the invention.

FIG. 5 shows a clamp-like device 302 similar to the device shown in FIGS. 1 and 2 except it includes two force applying members 306', 306" arranged at 90 degree angles to allow tensile or compressive forces to be applied at two separate locations of a work piece 324. It will be recognized that the particular angle of the device and the number of force applying members can be varied depending on the intended end-use application for the device.

The device 302 includes an angled body member 304 and a pair of force applying members 306', 306" in the form of plungers that are rotatably attached to the body member 304. Double-sided stretch releasing adhesive strips 308a are provided to removably adhesively bond the body member 304 to the surface 310 of a work piece 324, and adhesive strips 308b are provided to removably adhesively bond each plunger 306', 306" to the surface 310 of the work piece 324. The work piece 324 may be, for example, a frame including two pieces 324a,b being joined along a joint 326.

The body member 304 includes a 90 degree angle portion 304a containing a pair of internally threaded openings 312', 312" for rotatably receiving plungers 306', 306" respectively. A pair of leg portions 304b extend perpendicularly inwardly toward the work piece 324 from opposite ends of the angle portion 304a, and a pair of feet portions 304c are provided on the ends of each leg portion 304b. Adhesive strips 308a are affixed to the bottom surfaces of the feet portions 304c to adhesively bond the body member 304 to surface 310, and thereby securely bond the device 302 to the surface 310.

The plungers 306', 306" are arranged generally perpendicular to the angle portion 304a and each include a cylindrical threaded body portion 306a', 306a" which mates with and rotatably engages the respective threaded openings 312', 312" contained in the body member 304. Each plunger 306', 306" includes a handle 314', 314", respectively, arranged at one end of the body portion 306a', 306a" to facilitate manual rotation of the plunger 306, and a head 316', 316" arranged at the end of the body portion 306a', 306a" opposite the handle 314', 314", respectively. To generate a force using the device 302, it is operated in the same manner as the device 2 described above except each plunger 306', 306" must be separately actuated to generate a force.

Figure 6:
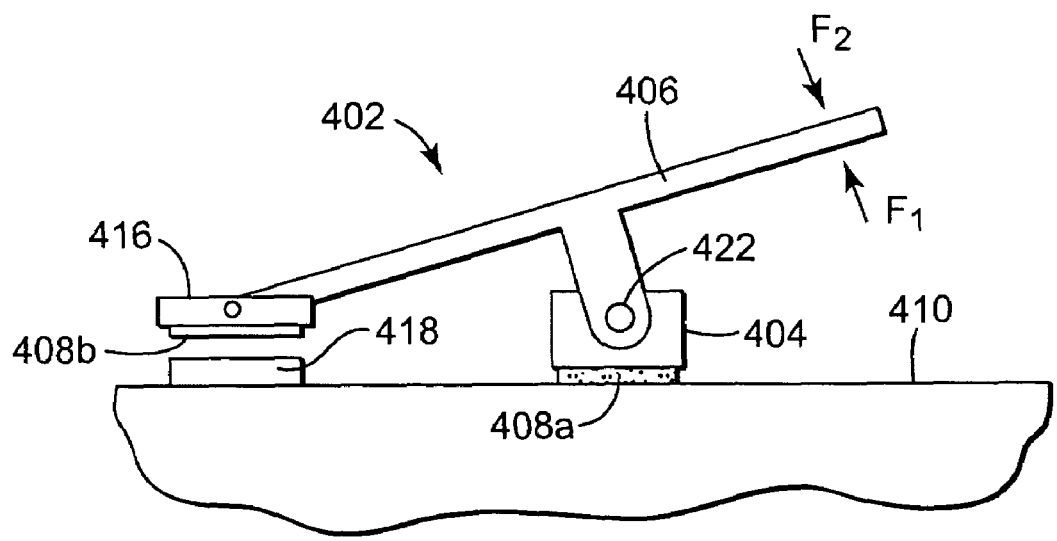
FIG. 6 is a side view of a fifth embodiment of a device that can be used in accordance with the invention.

FIG. 6 shows another device 402 in the form of a simple first class lever that can be used to apply a tensile or compressive force to an object or surface in accordance with the method of the present invention. Although only a first class lever is shown and described, it will be recognized that the method of the present invention may also be carried out using other types of levers.

The device 402 includes a body or base member 404, a force applying member 406 in the form of an elongated bar pivotally connected with the body member 404 via pin connection 422, a double-sided stretch releasing adhesive strip 408a attached to the base member 404 to removably adhesively bond the body member 404 to a surface 410, and a double-sided stretch releasing adhesive strip 408b attached to the force applying member 406 for adhesively bonding the force applying member 406 to surface 410 or an object 418 arranged between the force applying member 406 and the surface 410. A head 416 is provided on the end of the force applying member 406 that engages the object 418 or surface 410.

To generate a compressive force using the device, the device 402 is first attached to the surface 410 with double-sided stretch releasing adhesive strip 408a. A force is then applied to the force applying member 406 as indicated by $F_1$, thereby urging the head 416 in the direction of the object 418 and surface 410. When using the device to generate such a compressive force, adhesive strip 408b may be omitted. Conversely, to generate a tensile force using the device, the head 416 is attached to the object 418 with double-sided stretch releasing adhesive strip 408b. A force indicated by $F_2$ is then applied to the force applying member 406 to urge the head away from the object 418 and surface 410 and thereby impart a tensile force to the object 418 or surface 410. In this case, adhesive strip 408a may be omitted. The forces $F_1$ and $F_2$ may be produced manually, with a spring, hydraulically, pneumatically, or using other conventional means.

The various embodiments of the device, including both the body member and the force applying member, may be formed of a variety of materials depending on the particular intended end use application of the device. Suitable materials include metals such as aluminum and steel, synthetic plastic materials such as polycarbonate and polyvinyl chloride, and wood. The particular material selected is not significant to the invention hereof, so long as it provides the desired combination of properties such as adequate strength, low cost, and ease of manufacture.

It will be apparent to those of ordinary skill in the art that various changes and modifications may be made without deviating from the inventive concept set forth above. For example, it will be recognized that the size and shape of the device may be modified to adapt the device for certain specific end use applications. For example, the force may be generated by means other than a threaded connection or a spring. In addition, the number and size of the adhesive strips may be varied, the plunger may be provided with a pointed tip, drill bit, or other implement depending on the specific end use application intended for the device, and the location of the cantilever portion 204b may be moved. Thus, the scope of the present invention should not be limited to the structures described in this application, but only by the structures described by the language of the claims and the equivalents of those structures.

What is claimed is:

1. A method of applying a compressive force to a selected location on a work piece, comprising the steps of:
    (a) providing a device including a body member and a force applying member movably connected with the body member;
    (b) attaching the body member to a surface using a first double-sided stretch releasable adhesive strip, and attaching one end of the force applying member adjacent the selected location using a second double-sided stretch releasable adhesive strip; and
    (c) moving the force applying member toward the surface to generate a compressive force.

2. A method as defined in claim 1, further comprising the step of stretching the first double-sided stretch releasable adhesive strip to remove the adhesive from the body member and the surface.

3. A method as defined in claim 1, wherein the surface is formed of a material selected from the group consisting of cellulosic materials and masonry.

4. A method as defined in claim 1, wherein the work piece is a surface.

5. A method as defined in claim 1, wherein the work piece is an object.

6. A method as defined in claim 1, wherein the force applying member is threadably connected with the body member.

7. A method as defined in claim 1, wherein the force applying member is pivotally connected with the body member.

8. A method as defined in claim 1, wherein the force applying member is slidaby connected with the body member, and further wherein the device includes a force generating member arranged to bias the force applying member in the direction of the work piece.

9. A method as defined in claim 8, wherein the force generating member is a spring.

10. A method as defined in claim 1, wherein the device includes a pair of force applying members arranged at an angle.

11. The method defined in claim 1, wherein the body member is attached to the surface at a location distinct from the selected location and wherein moving the force applying member toward the surface to generate a compressive force includes moving the force applying member relative to the body member.

12. A method as defined in claim 1, wherein attaching the body member to the surface includes positioning the first double-sided stretch releasable adhesive strip such that a non-adhesive pull tab of the strip extends laterally beyond the body member.

13. A method of applying a tensile force to a selected location on a work piece, comprising the steps of:
   (a) providing a device including a body member and a force applying member movably connected with the body member;
   (b) attaching the body member to a surface with a first double-sided stretch releasable adhesive strip, whereby one end of the force applying member is adjacent the selected location;
   (c) attaching the force applying member to the surface using a second double-sided stretch releasable adhesive strip; and
   (d) moving the force applying member away from the surface to generate a tensile force.

14. A method as defined in claim 13, wherein the surface is formed of a material selected from the group consisting of cellulosic materials and masonry.

15. A method as defined in claim 13, wherein the work piece is a surface.

16. A method as defined in claim 13, wherein the work piece is an object.

17. A method as defined in claim 13, wherein the force applying member is threadably connected with the body member.

18. A method as defined in claim 13, wherein the force applying member is pivotally connected with the body member.

19. A method as defined in claim 13, wherein the force applying member is slidaby connected with the body member, and further wherein the device further includes a force generating member arranged to bias the force applying member in the direction of the work piece.

20. A method as defined in claim 19, wherein the force generating member is a spring.

21. A method of removing a dent from a surface, comprising the steps of:
   (a) providing a device including a body member and a force applying member movably connected with the body member;
   (b) arranging the device on the surface such that the body member is attached to the surface with a first double-sided stretch releasable adhesive strip and one end of the force applying member is adjacent the dent;
   (c) attaching the force applying member to the dented surface using a second double-sided stretch releasable adhesive strip; and
   (d) moving the force applying member away from the surface to generate a pulling force on the dented surface, wherein the pulling force is sufficient to remove the dent.

* * * * *